US011247689B2

(12) United States Patent
Watanabe (10) Patent No.: US 11,247,689 B2
(45) Date of Patent: Feb. 15, 2022

(54) INFORMATION PROCESSING SYSTEM AND INFORMATION PROCESSING METHOD

(71) Applicant: HONDA MOTOR CO., LTD., Tokyo (JP)

(72) Inventor: Kazuya Watanabe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/153,301

(22) Filed: Jan. 20, 2021

(65) Prior Publication Data

US 2021/0261138 A1    Aug. 26, 2021

(30) Foreign Application Priority Data

Feb. 21, 2020 (JP) .............................. JP2020-028702

(51) Int. Cl.
*B60W 40/09* (2012.01)
*B60W 50/12* (2012.01)
*B60W 50/14* (2020.01)

(52) U.S. Cl.
CPC ............ *B60W 40/09* (2013.01); *B60W 50/12* (2013.01); *B60W 50/14* (2013.01); *B60W 2540/22* (2013.01); *B60W 2540/229* (2020.02)

(58) Field of Classification Search
CPC ...... B60W 40/09; B60W 50/12; B60W 50/14; B60W 2540/229; B60W 2540/22
See application file for complete search history.

(56) References Cited

U.S. PATENT DOCUMENTS

| 10,137,902 B2* | 11/2018 | Juneja | G08G 1/0962 |
| 10,994,742 B2* | 5/2021 | Hayashi | B60W 40/09 |
| 2017/0147396 A1* | 5/2017 | Sekimoto | G06Q 30/02 |
| 2017/0220039 A1* | 8/2017 | Funakawa | B60W 50/14 |
| 2017/0243518 A1* | 8/2017 | Kanemaru | G06F 16/00 |
| 2019/0187700 A1* | 6/2019 | Zheng | B60W 60/0059 |
| 2019/0272450 A1* | 9/2019 | Ambeck-Madsen | G06K 9/00845 |
| 2019/0362717 A1* | 11/2019 | Koga | G10L 15/22 |

FOREIGN PATENT DOCUMENTS

JP    2019-178926    10/2019

* cited by examiner

*Primary Examiner* — Mohamed Barakat
(74) *Attorney, Agent, or Firm* — Rankin, Hill & Clark LLP (57) ABSTRACT

An information processing system includes a task acquisition unit configured to acquire a task to be presented to a driver, a load identification unit configured to identify a current driving load, and an output determination unit configured to determine whether the task is to be output to the driver or not. The output determination unit determines to output the task if a response expected time from output of the task to a response action by the driver is longer than a threshold value based on the driving load.

6 Claims, 7 Drawing Sheets

EXPECTED TIME INFORMATION (USER 130)

| TASK | TARGET | AREA | NUMBER OF TIMES | EXPECTED TIME (SEC) |
|---|---|---|---|---|
| PATH GUIDE INQUIRY | GAS STATION | CITY-A AREA | 1 | 10 |
| | | | 2 | 12 |
| | | | 3 | 15 |
| | | | ⋮ | ⋮ |
| | | TOWN-B AREA | 1 | 5 |
| | | | 2 | 7 |
| | | | ⋮ | ⋮ |
| | | TOWN-C AREA | 1 | 10 |
| | | | 2 | 12 |
| | | | ⋮ | ⋮ |
| | | OTHERS | 1 | 30 |
| | | | 2 | 30 |
| | | | ⋮ | ⋮ |
| | SUPERMARKET | CITY-A AREA | 1 | 10 |
| | | | 2 | 12 |
| | | | 3 | 15 |
| | | | ⋮ | ⋮ |
| | | TOWN-B AREA | 1 | 5 |
| | | | 2 | 7 |
| | | | ⋮ | ⋮ |
| | | TOWN-C AREA | 1 | 10 |
| | | | 2 | 12 |
| | | | ⋮ | ⋮ |
| | | OTHERS | 1 | 30 |
| | | | 2 | 30 |
| | | | ⋮ | ⋮ |
| ⋮ | ⋮ | ⋮ | ⋮ | ⋮ |
| PROPOSAL TO ACTIVATE ASSISTING SYSTEM | CRUISE CONTROL | | 1 | 10 |
| | | | 2 | 12 |
| | | | 3 | 15 |
| | | | ⋮ | ⋮ |
| | LANE KEEPING ASSIST | | 1 | 5 |
| | | | 2 | 7 |
| | | | ⋮ | ⋮ |
| | AUTOMATIC STEERING CONTROL | | 1 | 10 |
| | | | 2 | 12 |
| | | | ⋮ | ⋮ |
| | PARKING ASSIST | | 1 | 30 |
| | | | 2 | 30 |
| | | | ⋮ | ⋮ |
| ⋮ | ⋮ | ⋮ | ⋮ | ⋮ |
| PROPOSAL TO PLAY TUNE | | | 1 | 10 |
| | | | 2 | 12 |
| | | | 3 | 15 |
| | | | ⋮ | ⋮ |
| ⋮ | ⋮ | ⋮ | ⋮ | ⋮ |

FIG.5

TASK LEARNING LEVEL INFORMATION (USER 130)

| TASK | TARGET | AREA | NUMBER OF CHOICES | RESPONSE TIME (SEC) | | | | |
|---|---|---|---|---|---|---|---|---|
| | | | | 1ST | 2ND | 3RD | ... | 10TH |
| PATH GUIDE INQUIRY | GAS STATION | CITY-A AREA | 1 | 8 | 11 | 9 | ... | 12 |
| | | | 2 | 9 | 8 | 8 | ... | 7 |
| | | | ⋮ | ⋮ | ⋮ | ⋮ | ⋮ | ⋮ |
| | | TOWN-B AREA | 1 | 4 | 4 | 7 | ... | 2 |
| | | | 2 | 8 | 7 | 6 | ... | 6 |
| | | | ⋮ | ⋮ | ⋮ | ⋮ | ⋮ | ⋮ |
| | | ⋮ | ⋮ | ⋮ | ⋮ | ⋮ | ⋮ | ⋮ |
| | SUPERMARKET | CITY-A AREA | 1 | 3 | 3 | 7 | ... | 5 |
| | | | 2 | 5 | 5 | 6 | ... | 5 |
| | | | ⋮ | ⋮ | ⋮ | ⋮ | ⋮ | ⋮ |
| | | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ | ⋮ |
| PROPOSAL TO ACTIVATE ASSISTING SYSTEM | CRUISE CONTROL | | 1 | 4 | 8 | 3 | ... | 8 |
| | | | 2 | 6 | 7 | 7 | ... | 6 |
| | | | ⋮ | ⋮ | ⋮ | ⋮ | ⋮ | ⋮ |
| | ⋮ | | ⋮ | ⋮ | ⋮ | ⋮ | ⋮ | ⋮ |
| ⋮ | ⋮ | ⋮ | ⋮ | ⋮ | ⋮ | ⋮ | ⋮ | ⋮ |
| PROPOSAL TO PLAY TUNE | | | 1 | 17 | 18 | 20 | ... | 18 |
| | | | 2 | 19 | 15 | 20 | ... | 19 |
| | | | ⋮ | ⋮ | ⋮ | ⋮ | ⋮ | ⋮ |
| ⋮ | ⋮ | ⋮ | ⋮ | ⋮ | ⋮ | ⋮ | ⋮ | ⋮ |

FIG.6

DRIVING LOAD TABLE

| TRAFFIC SCENE | DRIVING LOAD |
|---|---|
| CONSTANT-SPEED STRAIGHT DRIVING | LOW |
| LANE CHANGING (WITHOUT SURROUNDING VEHICLES) | LOW |
| STOPPED | LOW |
| PARKED | LOW |
| | |
| LANE CHANGING (WITH SURROUNDING VEHICLES) | MEDIUM |
| START AFTER SIGNAL STOP | MEDIUM |
| ACCELERATING/DECELERATING DRIVING | MEDIUM |
| | |
| TURNING AT INTERSECTION | HIGH |
| MERGING TO HIGHWAY | HIGH |
| BACKWARD DRIVING | HIGH |
| PARKING | HIGH |
| | |

_US 11,247,689 B2_

INFORMATION PROCESSING SYSTEM AND INFORMATION PROCESSING METHOD

INCORPORATION BY REFERENCE

The present application claims priority under 35 U.S.C. § 119 to Japanese Patent Application No. 2020-028702 filed on Feb. 21, 2020. The content of the application is incorporated herein by reference in its entirety.

BACKGROUND OF THE INVENTION

Field of the Invention

The present invention relates to an information processing system and an information processing method that present a task involving a response action to a driver of a mobile unit such as an automobile.

Description of the Related Art

In a mobile unit such as an automobile, it may be considered that a vehicle control device, a navigation device and/or an audio-visual device, for example, make a proposal of a driver assisting function, a proposal of a destination or a stop-off point or a proposal to play back music to a driver of the mobile unit in response to a request from, for example, the driver or in accordance with a state of the driving operation by the driver which can be determined from, for example, facial expressions of the driver and/or based on a physiological state of the driver or the atmosphere of the inside of the mobile unit, (see Japanese Patent Laid-Open No. 2019-178926, for example).

However, some details of proposals presented to the driver may considerably require the thinking ability of the driver to determine whether the driver accepts the proposal or not. Particularly, in a case where a limited time length is given from presentation of a proposal to the driver to a response to the proposal by the driver (by, for example, executing a response operation or issuing a response voice instruction), the thinking of the driver concentrates on the determination, possibly resulting in a lack of concentration on driving actions.

On the other hand, the load (driving load) regarding driving operations on the driver varies momentarily in accordance with traffic conditions, and the degree of attention of the driver required for driving operations also varies. For that, according to some details of a proposal, it may be improper to present the proposal at that time dependent on the current degree of the driving load.

Because of the background above, it has been demanded to, in an information processing apparatus that presents a task involving a response action to a driver of a mobile unit such as a proposal to the driver, safely present various tasks without excessively dissipating the attention to driving operations of the driver.

SUMMARY OF THE INVENTION

One aspect of the present invention is an information processing system including a task acquisition unit configured to acquire a task to be presented to a driver of a mobile unit, a load identification unit configured to identify a current driving load on the driver, and an output determination unit configured to determine whether the acquired task is to be output to the driver or not in accordance with the driving load, wherein the output determination unit calculates a response expected time with respect to the acquired task and determines to output the acquired task to the driver if the calculated response expected time is longer than a threshold value calculated based on the current driving load, the response expected time being an expected time from a time when the task is output to the driver to a time when the driver executes a response action.

According to another aspect of the present invention, a value to be set for the threshold value is increased as the driving load increases.

According to another aspect of the present invention, the information processing system further includes a storage unit configured to store expected time information, the expected time information being information on a response expected time for at least one task having a chance to be presented to the driver. In this case, the output determination unit calculates the response expected time based on the expected time information.

According to another aspect of the present invention, the threshold value is calculated for each task based on the driving load and a learning level of response of the driver with respect to the task.

According to another aspect of the present invention, the threshold value includes a default threshold value not dependent on an individual driver and an inherent threshold value determined for each driver, and the output determination unit determines whether the acquired task is to be output to the driver or not by using the inherent threshold value if the driver satisfies a predetermined condition relating to a learning level of response with respect to the task.

Another aspect of the present invention is an information processing method including the steps of acquiring a task requested to a driver of a mobile unit by a task acquisition unit, identifying a current driving load on the driver by a load identification unit, and determining whether a request for the acquired task is to be output to the driver or not by an output determination unit, wherein in the determining, a response expected time is calculated and a request for the acquired task is determined to be output to the driver if the calculated response expected time is longer than a threshold value calculated based on the current driving load, the response expected time being an expected time from a time when the task is output to the driver to a time when the driver executes a response action.

According to the aspects of the present invention, in an information processing apparatus that presents a task involving a response action to a driver of a mobile unit such as a proposal to the driver, various tasks can be safely presented without excessively dissipating the attention to driving operations of the driver.

DETAILED DESCRIPTION OF THE PREFERRED EMBODIMENTS

Embodiments of the present invention are described below with reference to drawings.

Figure 1:
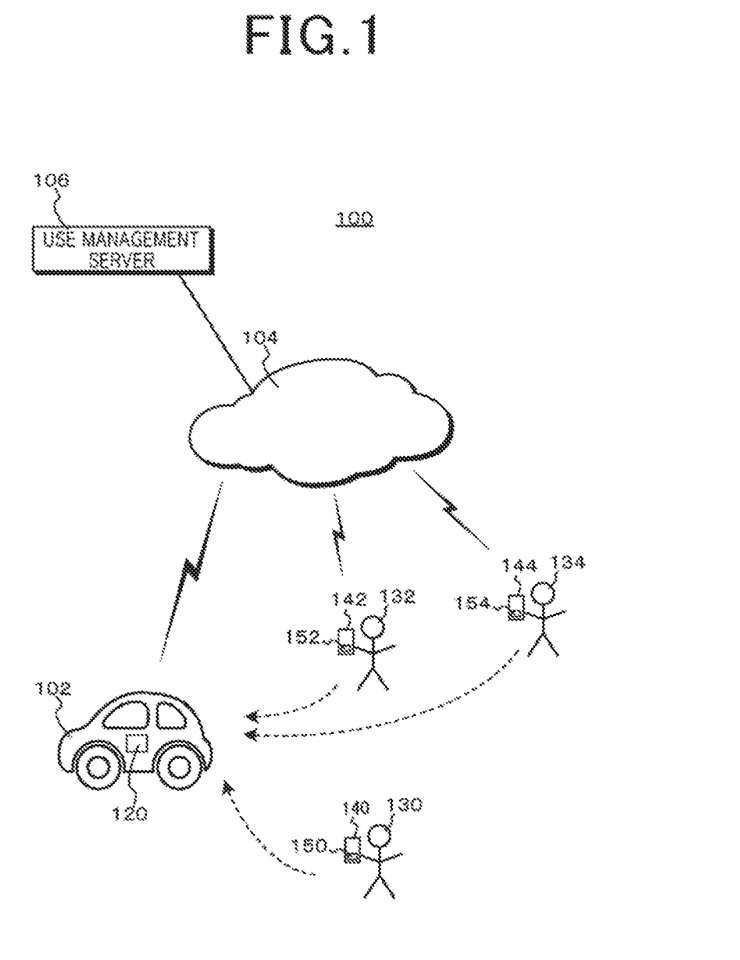
FIG. 1 is a diagram showing a configuration of an information processing system according to the present invention.

FIG. 1 is a diagram showing a configuration of an information processing system according to one embodiment of the present invention. An information processing system 100 includes, for example, an information processing apparatus 120 mounted on a vehicle 102 being a mobile unit and a use management server 106 provided externally to the vehicle 102. The information processing apparatus 120 and the use management server 106 are communicably connected over, for example, a communication network 104. The communication network 104 may be an open network such as the Internet or a private network.

The vehicle 102 is, for example, a shared car that can be used by a plurality of users, and each of a plurality of users 130, 132 and 134 can use the vehicle 102 as a driver of the vehicle 102. The users 130, 132 and 134 (hereinafter, also collectively called "users 130, etc.") are people permitted to use the vehicle 102 by an owner of the vehicle 102 and use the vehicle 102 by using key information pieces 150, 152 and 154 (hereinafter, also collectively called "key information 150, etc.") of an electronic key downloaded to mobile terminals 140, 142 and 144 (hereinafter, also collectively called "mobile terminals 140, etc.") being, for example, mobile phones, respectively, in accordance with a conventional technology.

The vehicle 102 can acquire the key information 150, etc. from the mobile terminals 140, etc. used for use of the vehicle 102 and, based on the acquired key information, determine whether one user of the users 130, etc. has started the use of the vehicle 102 as a driver.

Figure 2:
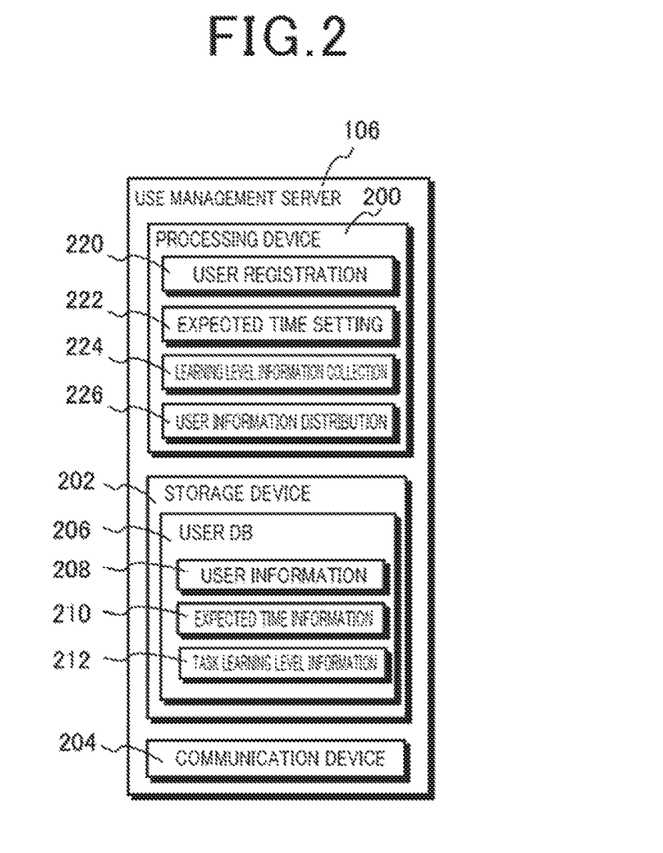
FIG. 2 is a diagram showing a configuration of a use management server included in the information processing system shown in FIG. 1.

FIG. 2 is a diagram showing a configuration of the use management server 106. The use management server 106 includes a processing device 200, a storage device 202, and a communication device 204. The communication device 204 is a wired communication device and/or a wireless communication device for communicating with the information processing apparatus 120 over the communication network 104. The storage device 202 is configured by, for example, a volatile and/or nonvolatile semiconductor memory and/or a hard disk drive. The storage device 202 stores a user database (DB) 206. In the user DB 206, user information 208, expected time information 210 and task learning level information 212 on each of the users 130, 132 and 134 are stored. Although FIG. 2 shows only one user information piece 208, expected time information piece 210 and task learning level information piece 212, it is understood that an equal number of the information pieces to the number of users exist because the information pieces are generated and stored within the user DB 206 for each user, as is described below.

The processing device 200 is, for example, a computer including a processor such as a central processing unit (CPU). The processing device 200 may have a read only memory (ROM) in which a program is written, a random access memory (RAM) for temporarily storing data and so on. The processing device 200 includes a user registration unit 220, an expected time setting unit 222, a learning level information collection unit 224, and a user information distribution unit 226 as functional elements or functional units.

The user registration unit 220 generates user information 208 for each user and stores it in the storage device 202 based on information on each of the users 130, etc. who desires to use the vehicle 102 in accordance with, for example, an instruction from the owner of the vehicle 102. The user information 208 can include the key information 150, etc. given to the mobile terminals 140, etc. of the corresponding users 130, etc. as well as information (area-related information) regarding relationship between the corresponding users 130, etc. and an area. The area-related information can include, for example, information (such as a name of a city, a town or a village) indicating an area and position information (such as a longitude and a latitude) for each category such as a place of residence, a place of business or a frequently visited place of the corresponding user.

The expected time setting unit 222 sets a response expected time for each of various tasks to be presented to a driver of the vehicle 102 with respect to each of the users 130, etc. who can be the driver. Here, the term "response expected time" refers to an expected time for each of the various tasks from output of the task to a driver to execution of a response action (such as an operation of an operating device such as a switch or a voice instruction) by the driver.

For example, based on a standard value of predetermined response expected times for various tasks and area-related information on a corresponding user stored in the user information 208, the expected time setting unit 222 calculates and sets a response expected time for each task with respect to the user.

The expected time setting unit 222 stores the information regarding the response expected times calculated for each of the users 130, etc. in the user DB 206 in the storage device 202 as the expected time information 210 for the user.

Figure 4:
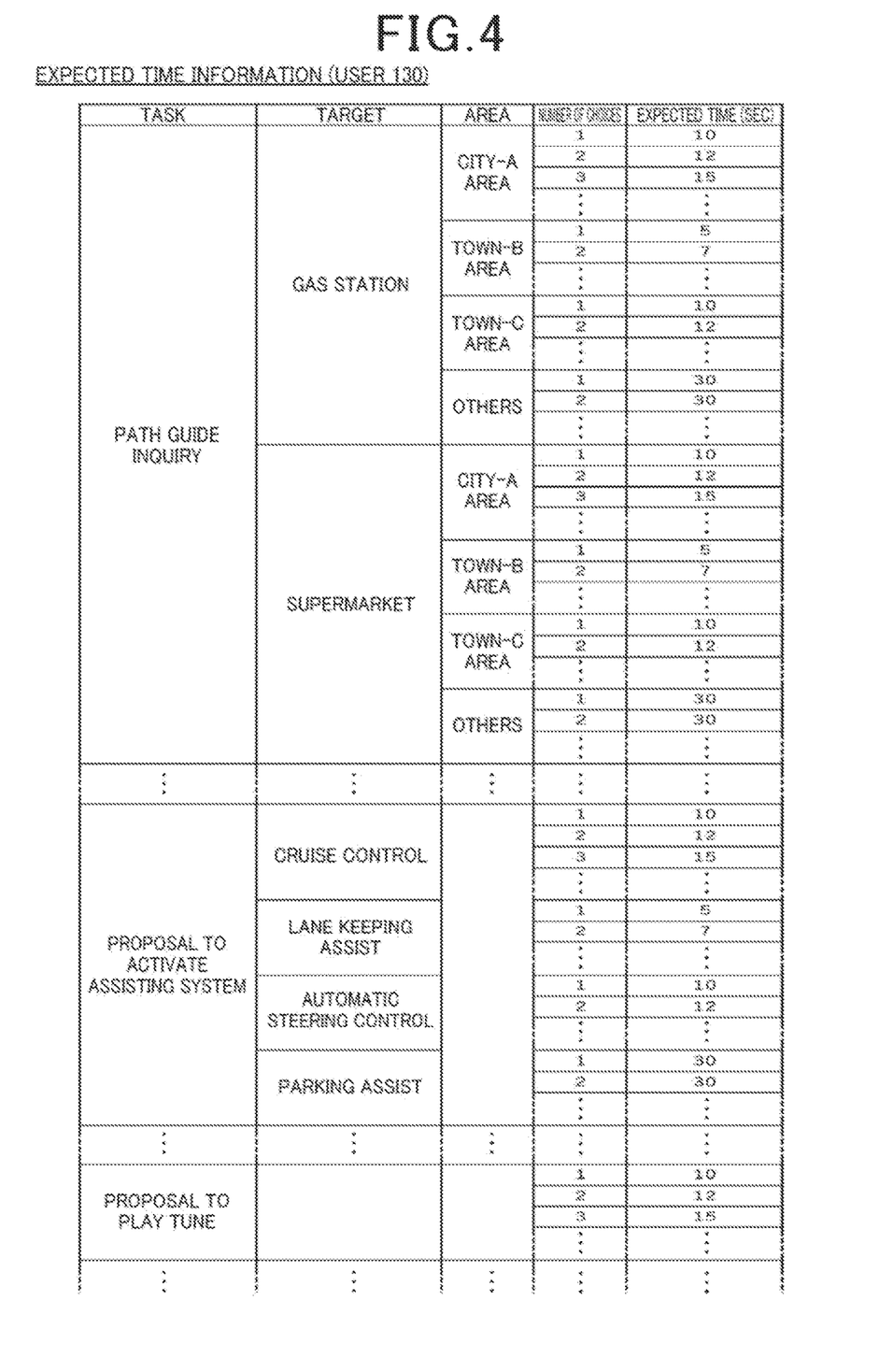
FIG. 4 is a diagram showing an example of expected time information stored in the use management server shown in FIG. 2.

FIG. 4 is a diagram showing an example of the expected time information 210. FIG. 4 shows the expected time information 210 on the user 130 as an example. An expected time for each task is shown at each row excluding the title row at the top of the shown table. "TASK", "TARGET", "AREA", "NUMBER OF CHOICES" and "EXPECTED TIME (SEC)" columns show a kind of task that can be presented to the user 130 who uses the vehicle 102 as a driver, a target, an area, the number of choices to be presented in the task, and a response expected time, respectively. Here, CITY A, TOWN B and TOWN C can be a place of residence, a place of business and a frequently visited place, respectively, of the user 130 indicated in the user information 208, for example. Rows having blanks in the "TARGET" and "AREA" columns show that no distinctions of targets and areas, respectively, exist in the response expected times for the corresponding tasks.

For example, the row immediately under the title row shows the response expected time of a task identified by "PATH GUIDE INQUIRY" shown in the "TASK" column about "GAS STATION" shown in the "TARGET" column within "CITY-A AREA" shown in "AREA" column and including a choice (that is, one choice) the number of which is shown in the "NUMBER OF CHOICES" column is "10 seconds" shown in the "EXPECTED TIME" column. This task can be a task such as "Would you like the guide of a path to the nearest gas station?" to be presented within the city-A area.

The row under that row shows that the response expected time about a task relating to the same task but having the number of choices equal to 2 such as a task "Would you like the guide of the path to the nearest gas station "GAS1" or "GAS2"? is 12 seconds. Here, "GAS1" and "GAS2" are, for example, names each for identifying a specific gas station.

Generally, the difficulty of the response to a task varies in accordance with the number of choices included in the task, and the relationship between the number of choices and the difficulty differs among individual users. For that, in the expected time information 210 exemplarily shown in FIG. 4, a response expected time for each number of choices included in a task is set. However, this is merely an example, and the expected time information 210 may not necessarily be set for each number of choices, or a response expected time for each number of choices may be set only for a task that is considered to be influenced by the number of choices.

In the "PATH GUIDE INQUIRY" task in the example shown in FIG. 4, for the "OTHERS" area other than the place of residence (city A), the place of business (town B) and the frequently visited place (town C) of the user 130, the expected time setting unit 222 sets, for example, a predetermined standard response expected time (such as 30 seconds if the number of choices is 1) for the "PATH GUIDE INQUIRY" task.

For the place of residence (city A), the place of business (town B) and the frequently visited place (town C), because the user 130 knows the places and it is considered that a response to the path guide inquiry can be performed more quickly than those to the other areas, the expected time setting unit 222 sets the response expected times to a shorter value than the standard value (such as 30 seconds). Here, how much shorter the response expected times of the tasks relating to the place of residence (city A), the place of business (town B) and the frequently visited place (town C) are to be set with respect to the standard value can be predetermined as a multiplier coefficient.

Also, referring to FIG. 4, the first row of four rows with "PROPOSAL TO ACTIVATE ASSISTING SYSTEM" in the "TASK" column shows that the response expected time of a task of the proposal to activate an assisting system relating to a "CRUISE CONTROL" function shown in the "TARGET" column and including "1" as the "NUMBER OF CHOICES" is "10 seconds" shown in the "EXPECTED TIME" column. For example, for a proposal to activate a parking assist function that is not often used by the user 130, the expected time setting unit 222 sets the response expected time to a standard value (such as 30 seconds if the number of choices is 1) for the "PROPOSAL TO ACTIVATE ASSISTING SYSTEM". How much shorter the response expected time for each assisting function is to be set with respect to the standard value can be predetermined as a multiplier coefficient.

The learning level information collection unit 224 collects information regarding a task learning level of each of the users 130, etc. from the vehicle 102, generates the expected time information 210 for each of the users based on the collected information and stores it in the user DB 206 in the storage device 202. More specifically, the learning level information collection unit 224 collects, from the vehicle 102 as information regarding a task leaning level, an actual value of the response time of each of the users 130, etc. to an actually presented task during a period when the user uses the vehicle 102 as a driver. The actual value is measured by the information processing apparatus 120, which is described below, included in the vehicle 102 and is transmitted to the use management server 106.

Figure 5:
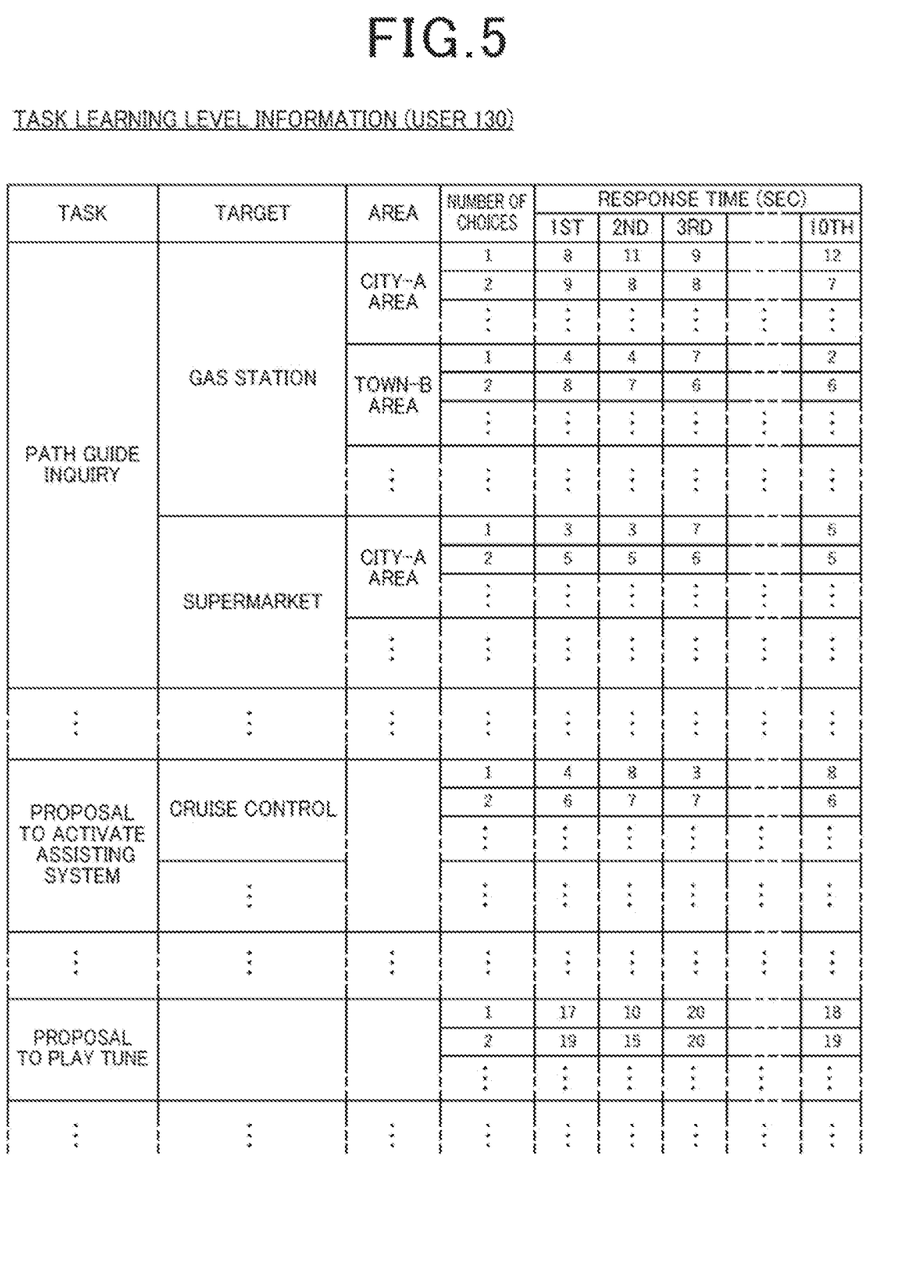
FIG. 5 is a diagram showing an example of task learning level information stored in the use management server shown in FIG. 2.

FIG. 5 is a diagram showing an example of the task learning level information 212. FIG. 5 shows the task learning level information 212 regarding the user 130 as an example. The shown task learning level information includes, in association with an expected time for each task indicated in the expected time information shown in FIG. 4, for example, a record of a response time required by the user 130 when the task is actually output (partial tasks are not shown in FIG. 5). In the shown example, the record of a response time includes, for example, actual values of the last 10 response times for each task.

For example, when one task is output, the information processing apparatus 120 in the vehicle 102, which is described below, actually measures a response time from a point in time when the task is output to a time in point when the user 130, for example, being a driver executes a response operation. The information processing apparatus 120 then transmits details of the task and the actual value of the response time to the use management server 106. The learning level information collection unit 224 then receives it as information regarding the task learning level and adds and stores the received actual value of the response time to the row of the corresponding task in the task learning level information 212. In this case, in the operation of adding and storing the actual value, if 10 actual values have already been stored in the row of the corresponding task in the task learning level information 212, the learning level information collection unit 224 can delete the oldest actual value and store the newly received actual value.

In response to reception of a transmission request from the information processing apparatus 120 in the vehicle 102 through the communication device 204, the user information distribution unit 226 transmits the expected time information 210 and the task learning level information 212 regarding the user 130, for example, designated by the transmission request to the information processing apparatus 120.

Figure 3:
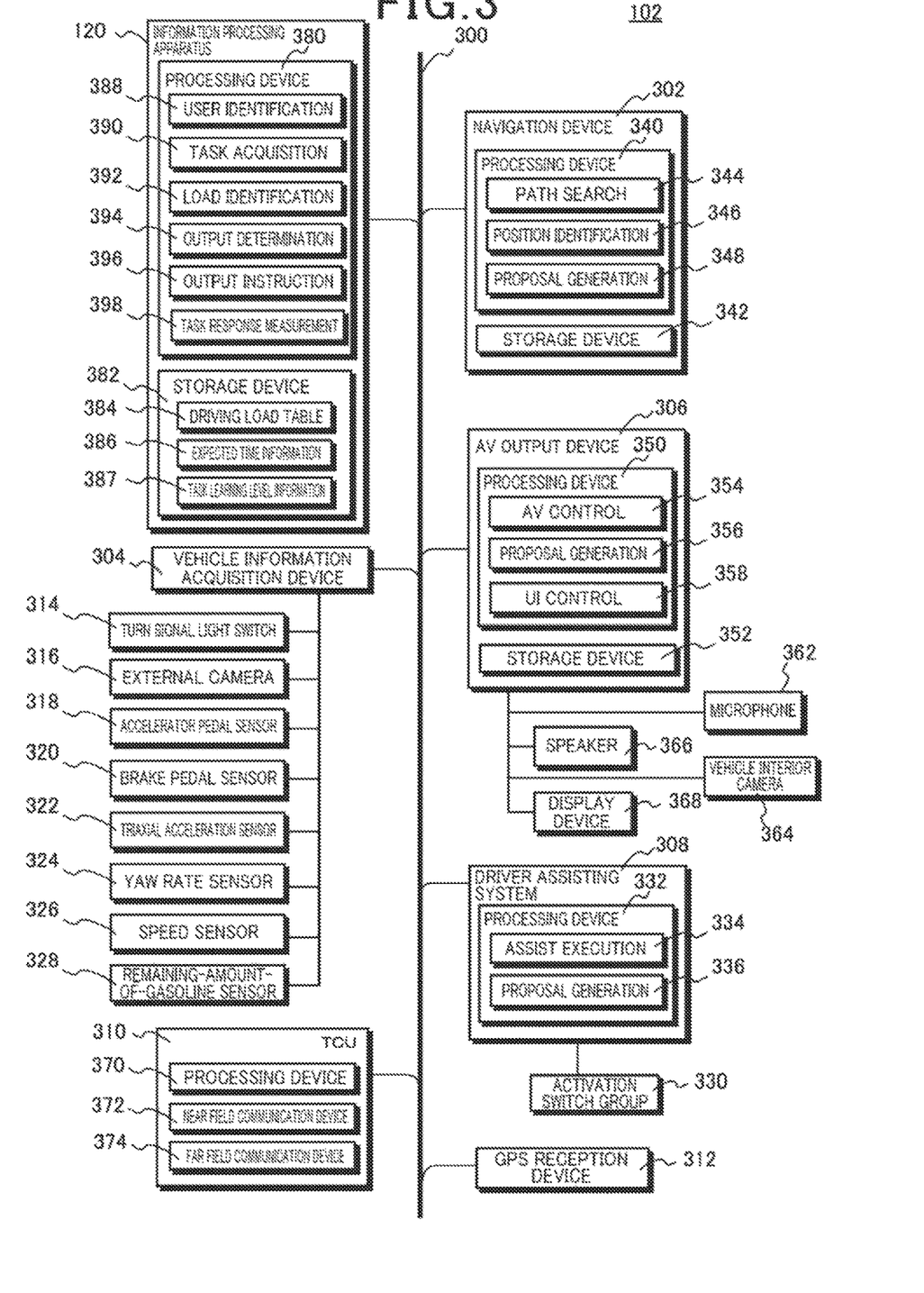
FIG. 3 is a diagram showing a configuration of an information processing apparatus included in the information processing system shown in FIG. 1.

Next, a configuration of the information processing apparatus 120 included in the vehicle 102 is described. FIG. 3 is a diagram showing an example of the configuration of the information processing apparatus 120. The information processing apparatus 120 is communicably connected to other control devices included in the vehicle 102 via a vehicle-mounted network bus 300. These other control devices may include, for example, a navigation device 302, a vehicle information acquisition device 304, an audio-visual (AV) output device 306, a driver assisting system 308, a telematics control unit (TCU) 310, and a GPS reception device 312.

The GPS reception device 312 receives, from a GPS satellite, information for identifying a current position of the vehicle 102 (such as information regarding a longitude, a latitude and an altitude). The vehicle information acquisition device 304 acquires information regarding an ON/OFF state of a turn signal light (not shown) from a turn signal light switch 314 included in the vehicle 102. The vehicle information acquisition device 304 further acquires image information regarding external environment of the vehicle 102 from an external camera 316 that is placed on the exterior of the body of vehicle 102 and captures images of the external environment.

The vehicle information acquisition device 304 further acquires sensor information regarding the amounts of depression of an accelerator pedal and a brake pedal from an accelerator pedal sensor 318 and a brake pedal sensor 320, respectively. The vehicle information acquisition device 304 further acquires information on an acceleration of three axes of a vertical direction, a vehicle width direction and a vehicle length direction applied to the vehicle 102, information on a rotational motion about the vertical direction as the center axis and information on the speed in the vehicle length direction from a triaxial acceleration sensor 322, a yaw rate sensor 324 and a speed sensor 326. The vehicle information acquisition device 304 further acquires sensor information regarding the remaining amount of gasoline in a fuel tank (not shown) from a remaining-amount-of-gasoline sensor 328 included in the fuel tank.

The TCU 310 includes a near field communication device 372, a far field communication device 374, and a processing device 370 that controls operations of these communication devices. The processing device 370 is a computer including a processor such as a CPU. The near field communication device 372 is a wireless communication device that communicates with the mobile terminals 140, etc. of the users 130, etc. in accordance with, for example, Bluetooth (registered trademark) communication standard. The far field communication device 374 is a wireless communication device for communicating with, for example, the use management server 106 over the communication network 104.

The driver assisting system 308 controls an internal combustion engine, a steering gear and/or a hydraulic brake (all of which are not shown) and executes a driving assisting operation. More specifically, the driver assisting system 308 includes a processing device 332 that is a computer including a processor such as a CPU. The processing device 332 includes an assist execution unit 334 and a proposal generation unit 336 that are functional elements or functional units implemented by execution of a program by the processing device 332.

According to a conventional technology, the assist execution unit 334 implements driver assisting functions such as cruise control (CC) by which the vehicle 102 is automatically driven by keeping a current speed at a constant speed, automatic lane keeping (ALK) control by which the steering gear is automatically operated such that the vehicle 102 is prevented from going out of the current driving lane, adaptive cruise control (ACC) by which the vehicle 102 follows a preceding vehicle by keeping the following distance to a predetermined distance, and parking assist (PA) that assists forward and backward and steering operations into a parking space for parallel parking, for example.

The assist execution unit 334 activates one of the driver assisting functions in response to an operation on one switch of an activation switch group 330 as a result of an operation performed by the user 130, for example, being a driver, on the activation switch group 330 and/or in accordance with details of a voice instruction from the driver acquired through the AV output device 306, which is described below.

The proposal generation unit 336 generates a proposal to a driver as to activation of one of the driver assisting functions in accordance with the current driving state of the driver. For example, if it is determined that the frequency of accelerating and decelerating operations is higher than a predetermined frequency on a substantially straight road or if it is determined that the frequency that a wheel of the vehicle 102 approaches to a predetermined distance or less from a lane mark or crosses a lane mark is higher than a predetermined frequency based on information regarding operations and environment of the vehicle 102 acquired by the vehicle information acquisition device 304, the proposal generation unit 336 can generate proposals such as "Would you like to activate the cruise control?" and "Would you like to activate the lane keeping assist?", respectively.

Alternatively, if it is determined that the frequency that the speed of changes of the following distance to the preceding vehicle exceeds a predetermined speed is equal to or higher than a predetermined value and if inherent vehicle operations for parking such as approaching or forward or backward operations to a parking lot are detected based on the information regarding operations and environment of the vehicle 102, the proposal generation unit 336 can generate proposals such as "Would you like to activate ACC?" and "Would you like to activate the parking assist?", respectively. The proposal generation unit 336 can determine whether the vehicle 102 has approached a parking lot or not by acquiring information on the current position of the vehicle 102 from the navigation device 302.

If a proposal is generated, the proposal generation unit 336 transmits the generated proposal to the information processing apparatus 120 as a task to be presented to the driver. At that time, the proposal generation unit 336 can transmit, for example, information on the task (such as information corresponding to the "TASK" column and the "TARGET" column on the table shown in FIG. 4) and a voice message to be output to a driver to the information processing apparatus 120.

The navigation device 302 includes a processing device 340 and a storage device 342. The processing device 340 is a computer including a processor such as a CPU and includes a path search unit 344, a position identification unit 346, and a proposal generation unit 348 as functional elements or functional units implemented by execution of a program.

The path search unit 344 searches a path from a current position to a destination in accordance with, for example, an instruction from the driver and, for example, displays an image showing the searched path on a display device 368 through the AV output device 306. The position identification unit 346 acquires information on a current position of the vehicle 102 based on information on GPS radio waves received by the GPS reception device 312 and outputs the information to, for example, the path search unit 344.

The proposal generation unit 348 generates a proposal about a stop-off point and a proposal about, for example, a path guide to a driver based on information on operations and environment of the vehicle 102 acquired from the vehicle information acquisition device 304 and/or, for example, facial expressions of the driver acquired from a vehicle interior camera 364 through the AV output device 306. For example, if the remaining amount of gasoline in the fuel tank is equal to or lower than a predetermined amount from information acquired from the vehicle information acquisition device 304, the proposal generation unit 348 can make a proposal such as "The vehicle is running out of gasoline shortly. Would you like to start the guide to the nearest gas station?" to the driver.

Alternatively, the proposal generation unit 348 can acquire posted text in, for example, an SNS server (not shown) connected to the communication network 104 through the TCU 310 at predetermined time intervals and, if information on a bargain sale starting time in a local supermarket is acquired, the proposal generation unit 348 can make a proposal such as "A bargain sale will start from 3:00 PM at Z Supermarket. Would you like to start the guide to Z Supermarket?" to the driver.

Alternatively, if the proposal generation unit 348 detects, according to a conventional technology, a physiological state of a driver from facial expressions of the driver acquired from the vehicle interior camera 364 through the AV output device 306 and detects a characteristic of fatigue in the facial expressions of the driver, the proposal generation unit 348 can make a proposal such as "Taking a break is necessary. Would you like to start the guide to the nearest convenience store?" to the driver.

If a proposal is generated, the proposal generation unit 348 transmits the generated proposal to the information processing apparatus 120 as a task to be presented to the driver. At that time, the proposal generation unit 348 can transmit, for example, information on the task (such as information corresponding to the "TASK" column, the "TARGET" column and "AREA" column on the table shown in FIG. 4) and a voice message to be output to the driver to the information processing apparatus 120.

The AV output device 306 plays back tunes and moving pictures. The AV output device 306 also functions as a voice interaction host with another device such as the navigation device 302 as a client and outputs voice information and visual information to be presented to the driver to the speaker 366 and the display device 368 in accordance with an instruction from the other device, acquires a voice instruction from the driver through a microphone 362 and outputs a recognition result of the voice instruction to the other device. The AV output device 306 further generates a proposal to, for example, play back a tune to a driver based on facial expressions of the driver acquired from the vehicle interior camera 364.

More specifically, the AV output device 306 includes a processing device 350 and a storage device 352. The processing device 350 is a computer including a processor such as a CPU and includes an AV control unit 354, a proposal generation unit 356, and a user interface (UT) control unit 358 as functional elements or functional units implemented by execution of a program.

According to a conventional technology, the AV control unit 354 reproduces AV content such as a tune, a moving picture and an image recorded in a removable recording medium such as a computer readable CD, DVD or USB memory and/or downloaded to and stored in the storage device 352 over, for example, the communication network 104 and outputs it to the speaker 366 and/or the display device 368.

The UI control unit 358 in accordance with an instruction from the proposal generation unit 356, the driver assisting system 308 and/or the information processing apparatus 120, which is described below, displays on the display device 368 an image or a moving picture designated by the instruction and transmits an input from the driver through a touch panel (not shown) provided to the display device 368 to the proposal generation unit 356, the driver assisting system 308 and/or the information processing apparatus 120. The UI control unit 358 in accordance with an instruction from the proposal generation unit 356, the driver assisting system 308 and/or the information processing apparatus 120 outputs a voice message designated by the instruction to the speaker 366. The UI control unit 358 further acquires from the microphone 362 a speech such as a voice instruction from the driver and transmits a voice recognition result of the speech to the proposal generation unit 356, the driver assisting system 308 and/or the information processing apparatus 120. The UI control unit 353 further acquires an image from the vehicle interior camera 364 and outputs the acquired image itself and/or a physiological state of the driver detected from the image according to a conventional technology to other devices such as the proposal generation unit 356 and the navigation device 302.

The proposal generation unit 356 generates a proposal to play back a tune to the driver based on information regarding operations and environment of the vehicle 102 acquired from the vehicle information acquisition device 304 and/or facial expressions of the driver acquired from the vehicle interior camera 364. For example, if a characteristic of fatigue is recognized in facial expressions of the driver acquired from the vehicle information acquisition device 304, the proposal generation unit 348 can make a proposal such as "Would you like to play "bbb" by "aaa" ?" to the driver in order to, for example, attempt to activate the thinking activity of the driver. Here, "aaa" and "bbb" are, for example, a specific name of an artist and a specific title of a tune.

After generating a proposal, the proposal generation unit 356 transmits the generated proposal to the information processing apparatus 120 as a task to be presented to the driver. At that time, the proposal generation unit 348 can transmit, for example, information regarding the task (such as the information corresponding to the "TASK" column on the table shown in FIG. 4) and a voice message to be output to the driver to the information processing apparatus 120.

When the navigation device 302, the AV output device 306 and/or the driver assisting system 308 generates a proposal and transmits the proposal as a task to be presented to the driver, the information processing apparatus 120 receives and acquires the task from the device or the system. Then, the information processing apparatus 120 outputs the task to the driver or stops the execution of the output in accordance with a state of the driving load on the user 130, for example, who is the current driver.

More specifically, the information processing apparatus 120 includes a processing device 380 and a storage device 382. The storage device 382 includes, for example, volatile and/or nonvolatile semiconductor memory and/or a hard disk drive.

The storage device 382 stores expected time information 386. The expected time information 386 is acquired by, when one of the users 130, etc. starts using the vehicle 102, downloading, from the use management server 106, the expected time information 210 on the corresponding user stored in the user DB 206 in the use management server 106 and storing it in the storage device 382 by a user identification unit 388, which is described below. In other words, the storage device 382 is a storage unit that stores, for at least one task that can be presented to the current driver of the vehicle 102 being a mobile unit, expected time information regarding an expected time from output of the task to the driver to execution of a response action by the driver.

For example, when the user 130 starts using the vehicle 102, the user identification unit 388 downloads the expected time information 210 on the user 130 as shown in FIG. 4 from the use management server 106 and stores it in the storage device 382 as the expected time information 386.

The storage device 382 further stores task learning level information 387. The task learning level information 387 is acquired by, when one user of the users 130, etc. starts using the vehicle 102, downloading, from the use management server 106, the task leaning level information 212 on the corresponding user stored in the user DB 206 in the use management server 106 and storing it in the storage device 382 by the user identification unit 388, which is described below, like the expected time information 386.

The storage device 382 further stores a driving load table 384. The driving load table 384 is a table defining the degrees of driving load of the driver of the vehicle 102 in association with various traffic scenes encountered by the vehicle 102 and is predetermined and is stored in the storage device 382.

The processing device 380 is a computer including a processor such as a CPU. The processing device 380 may have a ROM in which a program is written, a RAM for temporarily storing data and so on. The processing device 380 includes the user identification unit 388, a task acquisition unit 390, a load identification unit 392, an output determination unit 394, an output instruction unit 396, and a task response measurement unit 398 as functional elements or functional units.

These functional elements included in the processing device 380 are implemented by, for example, execution of a program by the processing device 380 being a computer. The computer program can be stored in an arbitrary computer readable storage medium. Instead of that, each of all or a part of the functional elements included in the processing device 380 can be configured by hardware including one or more electronic circuit parts.

When one user of the users 130, etc. starts using the vehicle 102 by using an electronic key in the corresponding one of the mobile terminals 140, etc., the user identification unit 388 identifies the user as the current driver from the key information 150, etc. on the used electronic key. The key information can be acquired from the mobile terminal 140, for example, through the near field communication device 372, be transmitted to a control device (not shown) for key authentication included in the vehicle 102 and be transmitted to the information processing apparatus 120 by, for example, the TCU 310 according to a conventional technology.

The user identification unit 388 communicates with the use management server 106 and downloads the expected time information 210 and the task learning level information 212 regarding the identified user from the user DB 206 in the use management server 106. Then, the user identification unit 388, as described above, stores the downloaded expected time information 210 and task learning level information 212 on the user being the current driver in the storage device 382 as the expected time information 386 and the task learning level information 387, respectively.

The task acquisition unit 390 receives and acquires a task to be presented to the driver, which is transmitted from the navigation device 302, the AV output device 306, and/or the driver assisting system 308.

The load identification unit. 392 identifies the current driving load on the current driver. More specifically, the load identification unit 392 acquires information on traffic environment (such as distinction of an area near an intersection, before a railroad crossing or at an entrance of a highway) with respect to the current position of the vehicle 102 from the navigation device 302. The load identification unit 392 further acquires, from the vehicle information acquisition device 304, information regarding the current operating state (such as constant-speed driving or accelerating/decelerating driving) of the vehicle 102 and information on an operating state of a traffic infrastructure (such as a lighting state of a traffic signal) in a traffic environment.

Then, the load identification unit 392 identifies a traffic scene in which the vehicle 102 is currently placed (such as constant-speed straight driving, lane changing, starting after a signal stop) based on the acquired information and identifies the degree of the driving load corresponding to the identified traffic scene. More specifically, the load identification unit 392 refers to the driving load table 384 stored in the storage device 382 and thus identifies the magnitude of the driving load corresponding to the identified traffic scene.

Figure 6:
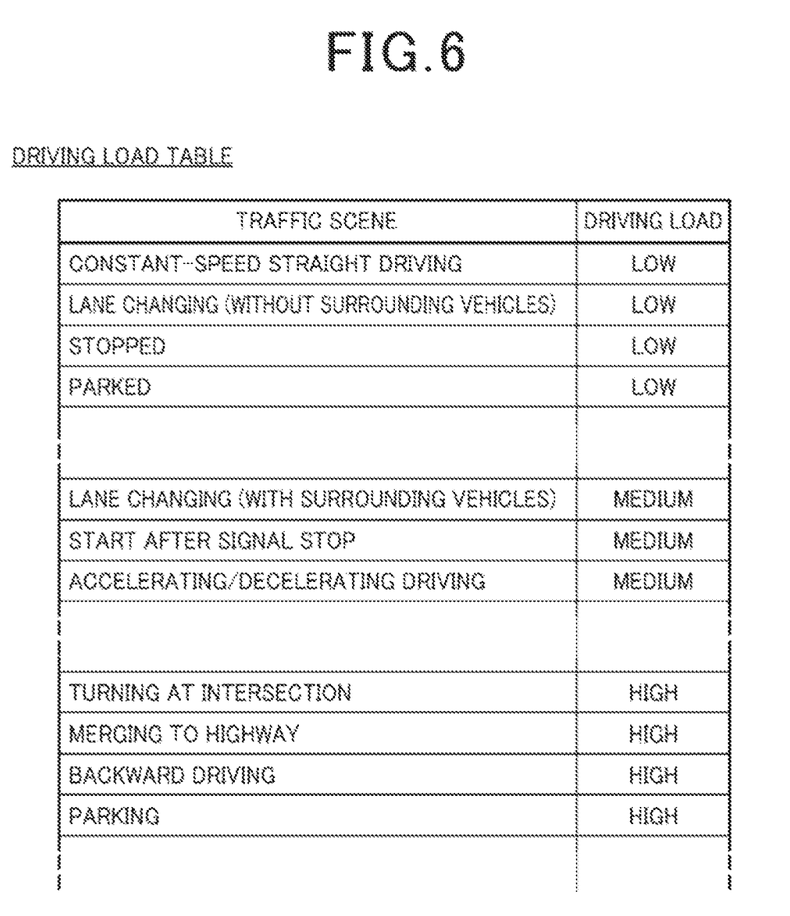
FIG. 6 is a diagram showing an example of a driving load table stored in the information processing apparatus shown in FIG. 3.

FIG. 6 is a diagram showing an example of the driving load table 384. In the shown example, various traffic scenes are shown in the left columns of the table, and three levels of "HIGH", "MEDIUM", and "LOW" are given in the corresponding right columns as the degrees of driving loads in the traffic scenes. For example, in a case where the current traffic scene determined from the information acquired from the navigation device 302 and/or the vehicle information acquisition device 304 is "LANE CHANGING (WITH SURROUNDING VEHICLES)", the load identification unit 392 determines "MEDIUM" as the current driving load of the driver of the vehicle 102 based on the driving load table 384 shown in FIG. 6.

The output determination unit 394 determines whether the task acquired by the task acquisition unit 390 is to be output to the current driver or not in accordance with the current driving load identified by the load identification unit 392. Particularly, the output determination unit 394 calculates a response expected time relating to the acquired task based on the expected time information 386 on the current driver stored in the storage device 382. For example, the output determination unit 394 acquires, as a response expected time, the time shown in the "EXPECTED TIME" column at the row corresponding to the acquired task based on the expected time information 386 that is the same as the expected time information 210 as shown in, for example, FIG. 4.

Then, the output determination unit 394 determines whether a request of the acquired task is to be output to the driver or not based on the acquired or calculated response expected time. More specifically, if the acquired or calculated response expected time is longer than a threshold value calculated based on the current driving load, the output determination unit 394 determines to output the request of the acquired task to the driver.

With respect to the threshold value, the magnitude of the threshold value to be set by the output determination unit 394 is increased as the driving load increases. Thus, for a high driving load, only tasks with longer response expected times are output to the driver. For example, the output determination unit 394 sets the threshold value to 25 seconds, 14 seconds and 0 seconds in accordance with the driving loads of three levels of "HIGH", "MEDIUM" and "LOW", respectively. In this case, in the range of tasks described in the table in FIG. 4, if the driving load is "LOW", all of the acquired tasks are output to the driver while, if the driving load is "HIGH", the "PATH GUIDE INQUIRY" about "GAS STATION" and "SUPERMARKET" in the "OTHERS" area and the "PROPOSAL TO ACTIVATE ASSISTING SYSTEM" about "PARKING ASSIST" are only output to the driver. The threshold value according to the driving loads can be predetermined and be stored in, for example, the storage device 382.

With respect to the response expected time to be compared with the threshold value, the output determination unit 394 may calculate the response expected time by multiplying the time shown in the "EXPECTED TIME" column by a predetermined coefficient in accordance with, for example, the climate or the brightness of the external environment of the vehicle 102. Alternatively, the output determination unit 394 may calculate the response expected time based on the learning level of the response for each task of the user 130, for example, being the current driver. In this case, the learning level of the task of the current user 130, for example, is acquired from the task learning level information 387 stored in the storage device 382.

For example, when the response expected time is calculated also based on the task learning level acquired from the task learning level information 387, the output determination unit 394 can calculate the response expected time by using the following expression.

$$tso \times (1+(1-tm/tso)) = tsn \quad (1)$$

Here, tso, tm and tsn are a response expected time acquired from the expected time information 210 in FIG. 4 (therefore, the expected time information 386), an average value of response time actual values of the corresponding task indicated by the task learning level information 387, and a response expected time to be used for determination on whether the request of the task described above is to be output to the driver or not (that is, to be compared with the threshold value), respectively.

In Expression (1), if the average value of response times actually measured in the past for the task corresponding to the acquired task is shorter 10% than the response expected time acquired from the expected time information 210 in FIG. 4 (therefore, the expected time information 386), a response expected time that is longer 10% than the response expected time acquired from the expected time information in FIG. 4 is calculated. Thus, more tasks are output to a user having a higher learning level of the task response, compared with a user having an equal driving load (that is, with respect to an equal threshold value). As tm described above, a maximum value of the response expected time may be used instead of the average value of the response time actual values.

Alternatively, the output determination unit 394 may calculate the threshold value in accordance with the learning level of a task instead of the calculation of the response expected time reflecting the learning level of the task as described above. For example, the output determination unit 394 may determine in advance a standard threshold value that is increased as the driving load increases, store the standard threshold value in, for example, the storage device 382 and corrects the standard threshold value in accordance with the learning level of the response for each task of the current driver to calculate a threshold value for the task.

For example, the output determination unit 394 refers to the task learning level information 387 stored in the storage device 382 and thus calculates an average value tav of actual values of the last 10 response times corresponding to a task acquired by the task acquisition unit 390. The output determination unit 394 can use, for example, the average value tav to acquire an actual threshold value for the task by using the following expression:

$$The = Ths \times (tav/tm) \quad (2)$$

where tm is a response expected time for the task acquired or calculated from the expected time information 386, Ths is a standard threshold value acquired based on the driving load table 384, and The is an actual threshold value to be used for determination on whether the task is to be output or not.

Thus, for example, because, in a case where the average value tav of the response time is shorter 10% than the response expected time tm as a result of the driver having learned the response to the task, the actual threshold value The is set to a value lower 10% than the standard threshold value Ths in accordance with the average value tav, the possibility that the task is output also when the driving load is higher is increased.

If output of the acquired task is determined, the output determination unit 394 instructs, for example, the AV output device 306 to voice-output the task and transmits a response reception instruction to instruct to receive a response from the driver about the task to the navigation device 302, the AV output device 306 or the driver assisting system 308 from which the task is acquired. In this case, if a plurality of choices are included in the proposal generated by the navigation device 302, the AV output device 306 or the driver assisting system 308, the user 130, for example, can return a response that selects one or more of the choices.

On the other hand, if it is determined that the acquired task is not to be output, the output determination unit 394 transmits an output disability notification regarding the task to the navigation device 302, the AV output device 306 or the driver assisting system 308 from which the task is acquired.

When receiving the response reception instruction regarding the generated task from the output determination unit 394, the navigation device 302, the AV output device 306 or the driver assisting system 308, according to a conventional technology, acquires a voice recognition result regarding a voice response from the driver to the task through the UI control unit 358 in the AV output device 306 or acquires a response from the driver through an operating device (not shown) such as a switch relating to the task. The navigation device 302, the AV output device 306 or the driver assisting system 308 then starts or stops execution of the operation proposed in the task in accordance with the acquired response.

On the other hand, when receiving the output disability notification regarding the generated task, the navigation device 302, the AV output device 306 or the driver assisting system 308 abandons the task or proposal without performing the operation proposed in the task.

If the output determination unit 394 outputs the task through, for example, the AV output device 306, the task response measurement unit 398 measures a response time from the output of the task to execution of a response operation (such as issuing the voice response or operating an operating device) by the driver regarding the task. The task response measurement unit 398 transmits to the use management server 106 the measured response time as information regarding the task learning level for the corresponding task of the current driver, that is, the user 130, for example. The task response measurement unit 398 can acquire the time when the response by the driver is performed from, for example, the navigation device 302, the AV output device 306 or the driver assisting system 308.

In the information processing system 100 having the above-described configuration, a task to be responded by the driver is acquired from, for example, the navigation device 302, and whether the task is to be output to the driver or not is determined based on the current driving load. More specifically, in the information processing system 100, a response expected time for a task to be presented from output of the task to execution of a response by the driver is calculated, and, if the response expected time is longer than the threshold value according to the current driving load of the vehicle 102, the task is output to the driver.

Thus, in the information processing system 100, with a higher driving load, a task having a longer response expected time is only output to the driver. In other words, with a higher driving load, because output of a task having a shorter response expected time that expects the driver to respond quickly is limited, distraction of the attention to driving operations by dispersion of thinking and concentration of the driver for determining a response to the task can be prevented. Therefore, in the information processing system 100, various tasks can be safely presented without excessively dissipating the attention to driving operations by the driver.

Figure 7:
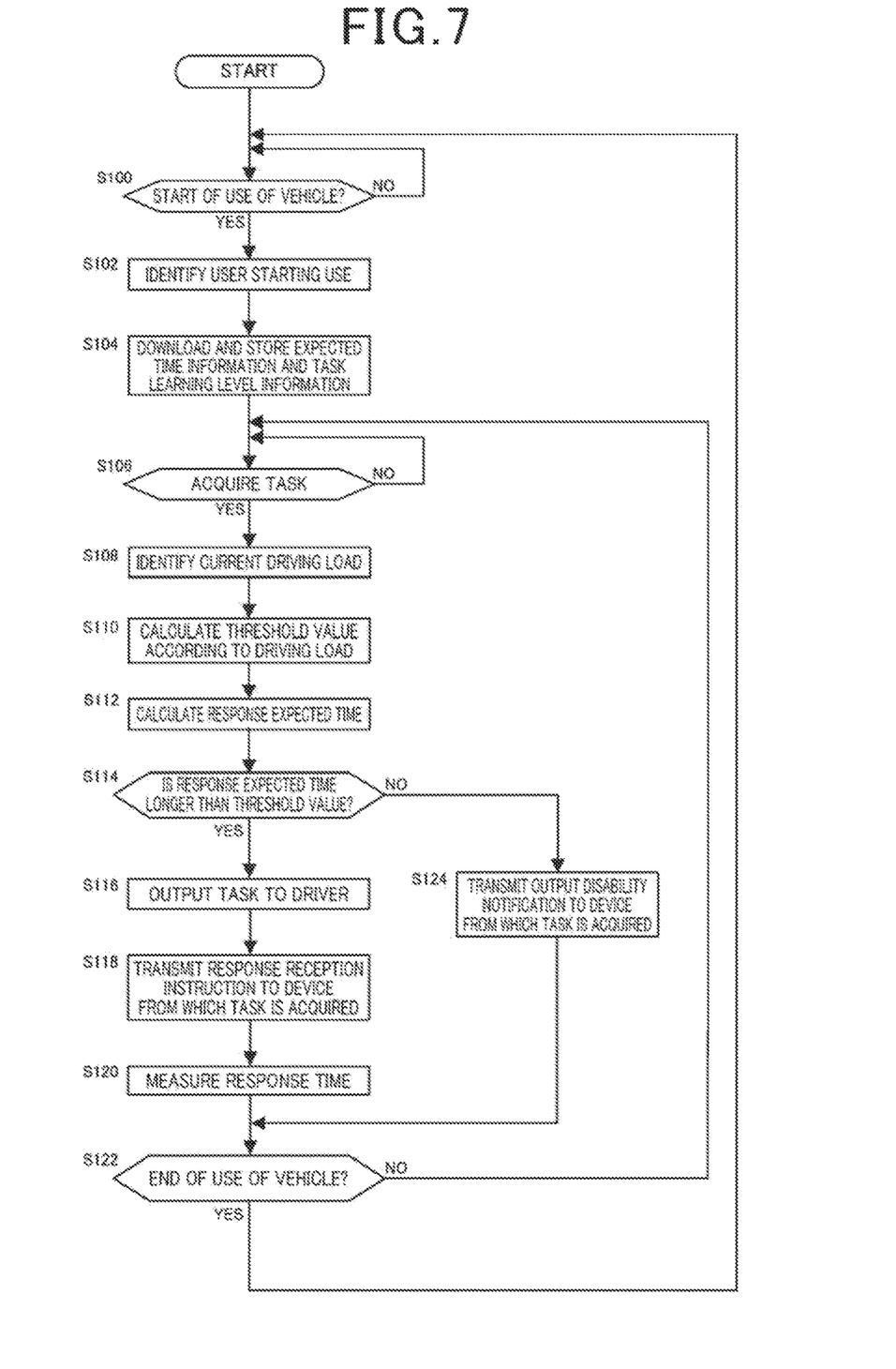
FIG. 7 is a flowchart showing a procedure of operations by the information processing apparatus shown in FIG. 3.

Next, an operating procedure of the information processing system 100 is described. FIG. 7 is a flowchart showing a procedure of operations in the information processing system 100. This processing starts when the information processing apparatus 120 is powered on at a state that a power supply to the use management server 106 included in the information processing system 100 has an ON state and ends when the information processing apparatus 120 is powered off.

When the processing starts, the user identification unit 388 in the information processing apparatus 120 first determines whether use of the vehicle 102 is started or not (S100). For example, when the user identification unit 388 receives information on the key information 150, for example, transmitted from the mobile terminal 140, for example, of the user 130, for example, starting the use of the vehicle 102 from the TCU 310, the user identification unit 388 determines that the use of the vehicle 102 is started.

Then, if the use of the vehicle 102 is not started (NO in S100), the user identification unit 388 returns to step S100 and repeats the processing. On the other hand, if the use of the vehicle 102 is started (YES in S100), the user identification unit 388 identifies the user 130, for example, starting the use of the vehicle 102 from the key information 150, for example, received from the TCU 310 according to a conventional technology (S102). In this embodiment, the user is one of the users 130, 132 and 134.

Subsequently, the user identification unit 388 downloads, from the use management server 106, the expected time information 210 and the task leaning level information 212 regarding the identified user 130, for example, and stores them in the storage device 382 as the expected time information 386 and the task learning level information 337 (S104).

Next, the task acquisition unit 390 determines whether a task transmitted from the navigation device 302, the AV output device 306 and/or the driver assisting system 308 is received and is acquired or not (S106). If no task is acquired (NO in S106), the task acquisition unit 390 returns to step S106 and repeats the processing. If a task is acquired (YES in S106), the load identification unit 392 identifies the current driving load (S108). The load identification unit 392 outputs information on the identified driving load to the output determination unit 394.

Next, the output determination unit 394 calculates a threshold value according to the identified current driving load (S110) and calculates a response expected time for the acquired task (S112). Subsequently, the output determination unit 394 determines whether the calculated response expected time is longer than the calculated threshold value or not (S114).

If the response expected time is longer than the threshold value (YES in S114), the output determination unit 394 determines to output the acquired task and outputs the task (S116). As described above, the output of the task can be performed by instructing the AV output device 306 to voice-output the task. Subsequently, the output determination unit 394 transmits a response reception instruction that instructs reception of a response from the driver with respect to the task to the navigation device 302, the AV output device 306, or the driver assisting system 308 from which the task is acquired (S118).

The task response measurement unit 398 further measures a response time from a time when the task is output in step S116 to a time when the driver responds thereto (S120). In this case, the task response measurement unit 398 can recognize that the driver has responded by acquiring a fact that voice recognition of response voice of the driver has completed or that the corresponding operating device such as a switch has been operated from the AV output device 306 or the device from which the task is acquired. The task response measurement unit 398 transmits the measured response time to the use management server 106.

Next, the user identification unit. 388 determines whether the use of the vehicle 102 by the current user ends or not (S122). This determination can be performed by detecting that, for example, the user 130, for example, being the current driver has turned off the driving device for the vehicle 102 and has locked vehicle doors according to a conventional technology. Then, if the use of the vehicle 102 ends (YES in S122), the user identification unit 388 returns to step S100 and repeats the processing. On the other hand, if the use of the vehicle 102 does not end (NO in S122), the user identification unit 388 returns to step S106 and repeats the processing.

On the other hand, if the response expected time is equal to or shorter than the threshold value in step S114 (NO in S114), the output determination unit 394 transmits an output disability notification to the device from which the task is acquired, that is, the navigation device 302, the AV output device 306 or the driver assisting system 308 in this embodiment (S124). After that, the output determination unit 394 moves the processing to step S122.

VARIATION EXAMPLES

Next, variation examples of the information processing system 100 are described. Although, in the description above, the output determination unit 394 determines whether the task output to the driver is to be performed or not by using a predetermined threshold value or a threshold value calculated based on a predetermined standard threshold value and the learning level of the task response (actual values of the response times), how the threshold value is determined is not limited thereto.

As a variation example, instead of the operation above, the output determination unit 394 may determine whether the task output to the driver is to be performed or not by using two kinds of threshold values including a default threshold value not dependent on an individual user (that is, the driver) and an inherent threshold value dependent on each user. Here, the default threshold value may be the standard threshold value as described above that is predetermined and is stored in the storage device 382. The output determination unit 394 can use the default threshold value for a task not satisfying a predetermined condition regarding the task learning level, for example, and use the inherent threshold value for a task satisfying the predetermined condition.

The predetermined condition can be arbitrarily determined, and one or a plurality of conditions may be determined. When a plurality of predetermined conditions are provided and every time one of the predetermined conditions is satisfied by one task, an inherent threshold value corresponding to the satisfied predetermined condition can be determined for the task.

The predetermined conditions can include, for example, conditions "a response to the task has been made even once by the user" and/or "a response to the task has been made a predetermined number of times or higher (such as three or more times) by the user within a predetermined period (such as three months)".

The method for calculating the inherent threshold value can be arbitrarily determined. For example, in the above-described example, each of the inherent threshold values can be calculated by handling the average tav, for example, in Expression (2) above as an actual value of the last one response time or an average value of the last three response time actual values. Alternatively, the inherent threshold value may be calculated by multiplying the default threshold value by a predetermined multiplier if the predetermined condition is satisfied.

Instead of or in addition to the determination of the predetermined condition for an individual task, the predetermined condition may be determined for all of tasks. In this case, if the predetermined condition is satisfied for all of tasks, an inherent threshold value can be calculated for a part or all of the tasks, for example, by applying a multiplier predetermined for each of the tasks or a multiplier determined for all of the tasks with respect to the default threshold value.

The present invention is not limited to the configuration of the above-described embodiment but is implemented in various embodiments without departing from the spirit and scope.

For example, having described that, according to the above-described embodiment, the vehicle 102 is a shared car as an example, the vehicle 102 is not limited thereto. The vehicle 102 can be an arbitrary kind of mobile unit that is used for an arbitrary purpose. For example, the vehicle 102 may be a private vehicle or a bus, a two-wheel vehicle or other arbitrary mobile units. When the vehicle 102 is a two-wheel vehicle, the user interface of the speaker 366 and the microphone 362 can be a head set communicably connected to the AV output device 306 via, for example, Bluetooth.

Although, in the above-described embodiment, the vehicle 102 is used by one of the three users 130, 132 and 134, the number of users who use the vehicle 102 as a driver is not limited to three. The number of users who can use the vehicle 102 can be any arbitrary number equal to or higher than one.

Although, in the above-described embodiment, the information processing system 100 includes one information processing apparatus 120 mounted on one vehicle 102 and the use management server 106 as an example, the number of the information processing apparatus 120 included in the information processing system 100 is not limited to one. The number of the information processing apparatus 120 to be included in the information processing system 100 can be an arbitrary number of information processing apparatuses mounted on an arbitrary number of vehicles equal to or higher than one such as the vehicle 102.

In this case, also when the user 130, for example, sequentially uses the plurality of vehicles 102, a task according to the driving load can be presented to the user in each of the vehicles by the information processing apparatus 120 in the vehicle 102 currently being driven by the user based on the expected time information 210 and the task learning level information 212 on the user himself or herself stored in the storage device 202 in the use management server 106. For example, the use management server 106 may give a unique identifier (ID) to each of the users 130, etc. and store the user information 208, the expected time information 210 and the task learning level information 212 in association with the ID, and the key information on the mobile terminal 140, for example, held by the user 130, for example, includes the ID of the user.

Thus, when the use management server 106 receives a transmission request from the information processing apparatus 120 in an arbitrary vehicle 102, the use management server 106 can transmit the expected time information 210 on the corresponding user to the information processing apparatus 120 in the vehicle 102 being currently used by the user based on, for example, the ID of the user and an identification code of the vehicle 102 included in the transmission request.

Alternatively, the information processing system 100 may not include the use management server 106 provided externally to the vehicle 102, but the information processing system 100 may include a use management device having the same functions as the processing device 200 and the storage device 202 of the use management server 106 in the vehicle 102 having the information processing apparatus 120. In this case, the use management device and the information processing apparatus 120 are communicably connected via the vehicle-mounted network bus 300, and an information processing system similar to the information processing system 100 is implemented within the vehicle 102.

Although, according to the above-described embodiment, the path inquiry, proposal to activate assisting system and tune proposal from the navigation device 302, the driver assisting system 308 and the AV output device 306 as shown in FIG. 4 are described as examples of tasks handled by the information processing system 100, the tasks to be presented to the driver are not limited thereto. A task to be handled by the information processing system 100 can be an arbitrary task if the driver performs some response action after the task is presented to the driver and if the response expected time from the presentation to the response action can be defined and be calculated. The number of tasks that can be presented to the driver may be one without limiting to a plurality of tasks. In this case, whether the one task is to be presented to the driver or not is determined based on the response expected time for the task and a threshold value according to the driving load.

Although, in the information processing system 100 of the above-described embodiment, the output determination unit. 394 in the information processing apparatus 120 acquires the response expected time for the acquired task from the expected time indicated in the expected time information 210 or 386 as shown in FIG. 4, the present invention is not limited thereto. The output determination unit 394 can calculate an individual and specific response expected time for the acquired task based on a parameter other than the expected time for the corresponding task indicated in the expected time information 210 or 386.

Such a parameter can be, for example, a time until the proposal details indicated by the acquired task lose its meaning. For example, in a case of a path guide start inquiry task to a gas station as in the example shown in FIG. 4, when the vehicle 102 must make its right turn at the intersection close to the vehicle 102 to go to the nearest gas station and, if the vehicle 102 passes by the intersection, the gas station is no longer the nearest gas station, the output determination unit 394 can calculate the response expected time from the distance to the intersection and the current vehicle speed of the vehicle 102. In this case, the output determination unit 394 can use the calculated response expected time instead of the expected time indicated by the expected time information 386 if the calculated response expected time is shorter than the expected time indicated by the expected time information 386.

Although, in the above-described information processing system 100, the degree of the driving load to be identified by the load identification unit 392 in the information processing apparatus 120 has three levels of "HIGH", "MEDIUM" and "LOW" as shown in FIG. 6, the representation of the driving load is not limited thereto. The magnitude of the driving load can be represented by three or more levels or can be represented as serial values.

Although, in the information processing system 100 of the above-described embodiment, the threshold value for the response expected time to be used for the determination on whether the task is to be output or not by the output determination unit 394 in the information processing apparatus 120 is determined in accordance with the driving load or in accordance with the driving load and the task learning level, the configuration of the information processing system 100 is not limited thereto. The threshold value can be determined in consideration of a parameter other than those described above.

For example, the threshold value can be calculated also in consideration of the learning level of driving operations of the corresponding user 130, for example. Such a learning level of driving operations can be given based on a difference value acquired by subtracting a standard time (such as an average value among an indefinite number of drivers) for each of a lane changing operation, a turning operation, a decelerating operation and so on from an operating time required for the driving operations by the user 130, for example, when the user 130, for example, can concentrate on the driving operations (such as a state that no task presentation is performed). The difference value can be a negative value having an absolute value that is increased as the learning level for the corresponding operation increases.

The output determination unit 394 can determine, as a threshold value to be actually used, a value acquired by, for example, performing weighting addition of an average value of the difference values for all operations (that is, by adding a value acquired by multiplying the average value by a predetermined value) to a threshold value predetermined in accordance with the driving load. Thus, a lower threshold value is applied to a user having a higher learning level for the driving operations, and more tasks can be presented compared to other users having an equal driving load.

The above-described information processing system 100, as described above, includes the task acquisition unit 390 acquiring a task to be presented to a driver of the vehicle 102 being a mobile unit, the load identification unit 392 identifying a current driving load on the driver, and the output determination unit 394 determining whether the acquired task is to be output to the driver or not in accordance with the driving load. The output determination unit 394 calculates a response expected time that is an expected time from a time when the task is output to the driver to a time when the driver executes a response action for the acquired task and determines to output the acquired task to the driver if the calculated response expected time is longer than a threshold value calculated based on the current driving load.

According to this configuration, because output of a task having a response expected time shorter than the threshold value calculated in accordance with the driving load is limited, various tasks can be safely presented in accordance with the driving load without excessively dissipating attention to driving operations of the driver.

In the information processing system 100, a value to be set for the threshold value is increased as the driving load increases. According to this configuration, because output of a task with a shorter response expected time such as a task expecting the driver to perform a quick response is limited when the driving load is higher, various tasks can be safely presented in accordance with the driving load without excessively dissipating the attention to driving operations of the driver.

The information processing system 100 further includes the storage device 382 storing the expected time information 386 being information on a response expected time for at least one task that can be presented to the driver. The output determination unit 394 calculates the response expected time based on the expected time information 386. According to this configuration, response expected times for various tasks can be easily calculated.

In the information processing system 100, the threshold value is calculated for each task for each driver based on the driving load and a learning level of response of the driver with respect to the task. According to this configuration, because, even with a high driving load, a task is presented to the driver if the driver has learned about the task, a task presentation operation with higher convenience can be realized.

In the information processing system 100, the threshold value can include a default threshold value not dependent on an individual driver and an inherent threshold value determined for each driver. The output determination unit 394 can determine whether the acquired task is to be output to the driver or not by using the inherent threshold value if a predetermined condition about the learning level of response of the driver with respect to the task is satisfied. According to this configuration, because, for example, more tasks can be output to a user having a higher learning level of task response, a highly convenient system suitable for an individual user can be configured.

In the information processing system 100, an information processing method including step S106 of acquiring a task requested to a driver of the vehicle 102 by the task acquisition unit 390, step 3108 of identifying a current driving load on the driver by the load identification unit 392, and step S114 of determining whether a request for the acquired task is to be output to the driver or not by the output determination unit 394 is executed. In step S114 of determining, a response expected time that is an expected time from a time when the task is output to the driver to a time when the driver executes a response action is calculated, and outputting a request for the acquired task to the driver is determined if the calculated response expected time is longer than a threshold value calculated based on the current driving load.

According to this configuration, because the output of a task with a response expected time shorter than the threshold value calculated in accordance with the driving load is limited, various tasks can be safely presented in accordance with the driving load without excessively dissipating the attention to driving operations of the driver.

REFERENCE SIGNS LIST

100: information processing system, 102: vehicle, 104: communication network, 106: use management server, 120: information processing apparatus, 130, 132, 134: user, 140, 142, 144: mobile terminal, 150, 152, 154: key information, 200, 332, 340, 350, 370, 380: processing device, 202, 342, 352, 382: storage device, 204: communication device, 206:

user DB, 208: user information, 210, 386: expected time information, 212, 387: task learning level information, 220: user registration unit, 222: expected time setting unit, 224: learning level information collection unit, 226: user information distribution unit, 300: vehicle-mounted network bus, 302: navigation device, 304: vehicle information acquisition device, 306: AV output device, 308: driver assisting system, 310: TCU, 312: GPS reception device, 314: turn signal light switch, 316: external camera, 318: accelerator pedal sensor, 320: brake pedal sensor, 322: triaxial acceleration sensor, 324: yaw rate sensor, 326: speed sensor, 328: remaining-amount-of-gasoline sensor, 330: activation switch group, 334: assist execution unit, 336, 348, 356: proposal generation unit, 344: path search unit, 346: position identification unit, 354: AV control unit, 358: UI control unit, 362: microphone, 364: vehicle interior camera, 366: speaker, 368: display device, 372: near field communication device, 374: far field communication device, 384: driving load table, 388: user identification unit, 390: task acquisition unit, 392: load identification unit, 394: output determination unit, 396: output instruction unit, 398: task response measurement unit

What is claimed is:

1. An information processing system comprising a processing device including a processor, wherein the processing device is configured to:
   acquire a task to be presented to a driver of a mobile unit;
   identify a current driving load on the driver;
   determine whether the acquired task is to be output to the driver or not in accordance with the driving load; and
   calculate a response expected time with respect to the acquired task and determine to output the acquired task to the driver if the calculated response expected time is longer than a threshold value calculated based on the current driving load, the response expected time being an expected time from a time when the task is output to the driver to a time when the driver executes a response action.

2. The information processing system according to claim 1, wherein a value to be set for the threshold value is increased as the driving load increases.

3. The information processing system according to claim 1, further comprising:
   a memory configured to store expected time information, the expected time information being information on a response expected time for at least one task having a chance to be presented to the driver,
   wherein the processing device is configured to calculate the response expected time based on the expected time information.

4. The information processing system according to claim 1, wherein the threshold value is calculated for each task based on the driving load and a learning level of response of the driver with respect to the task.

5. The information processing system according to claim 1, wherein
   the threshold value includes a default threshold value not dependent on an individual driver and an inherent threshold value determined for each driver, and
   the processing device is configured to determine whether the acquired task is to be output to the driver or not by using the inherent threshold value if the driver satisfies a predetermined condition relating to a learning level of response with respect to the task.

6. An information processing method comprising the steps of:
   acquiring a task requested to a driver of a mobile unit by a processing device including a processor;
   identifying a current driving load on the driver by the processing device; and
   determining whether a request for the acquired task is to be output to the driver or not by the processing device,
   wherein in the determining, a response expected time is calculated and a request for the acquired task is determined to be output to the driver if the calculated response expected time is longer than a threshold value calculated based on the current driving load, the response expected time being an expected time from a time when the task is output to the driver to a time when the driver executes a response action.

* * * * *